(12) United States Patent
Hagen

(10) Patent No.: US 6,427,616 B1
(45) Date of Patent: Aug. 6, 2002

(54) WAKE ENHANCEMENT ASSEMBLY

(76) Inventor: Toni Lynn Hagen, 3418 E. Mercer La., Phoenix, AZ (US) 85028

( * ) Notice: Subject to any disclaimer, the term of this patent is extended or adjusted under 35 U.S.C. 154(b) by 0 days.

(21) Appl. No.: 09/826,593

(22) Filed: Apr. 5, 2001

(51) Int. Cl.⁷ ............................................. B63B 39/03
(52) U.S. Cl. ....................................... 114/125; 114/121
(58) Field of Search ................................ 114/121, 125, 114/271

(56) References Cited

U.S. PATENT DOCUMENTS

| | | | |
|---|---|---|---|
| 5,549,071 A | 8/1996 | Pigeon et al. | 114/286 |
| 5,787,835 A | 8/1998 | Remnant | 114/125 |
| 6,044,788 A * | 4/2000 | Larson et al. | 114/125 |
| 6,105,527 A | 8/2000 | Lochtefeld et al. | 114/125 |
| 6,158,375 A | 12/2000 | Stuart, Jr. | 114/271 |
| 6,234,099 B1 * | 5/2001 | Jessen et al. | 114/121 |

OTHER PUBLICATIONS

Wake Boarding Magazine dated Feb. 2001; pp. 93,94,95,96 106,108 and 110.

* cited by examiner

*Primary Examiner*—Jesus D. Sotélo
(74) *Attorney, Agent, or Firm*—Howard & Howard

(57) ABSTRACT

The subject invention is a wake enhancement assembly to vary a configuration of a wake produced by the hull of a boat. The assembly preferably includes three or four fluid chambers adapted to be disposed within the hull of the boat. The fluid chambers can be filled to provide added weight in selected areas of the hull. The added weight alters how the hull rides within a body of water and as such will alter the wake of the boat. A plurality of hoses are mounted to and in fluid communication with the fluid chambers for selectively filling and draining the fluid chambers. The assembly is characterized by a manifold having an inlet and a plurality of outlets. Each of the outlets has a valve disposed in fluid communication therewith. The filling hoses are connected to the outlets such that the valves of the manifold control a flow of fluid to and from the fluid chambers independently of each other. The valves and manifold electronically and remotely control the selective filling and draining of the fluid chambers.

43 Claims, 6 Drawing Sheets

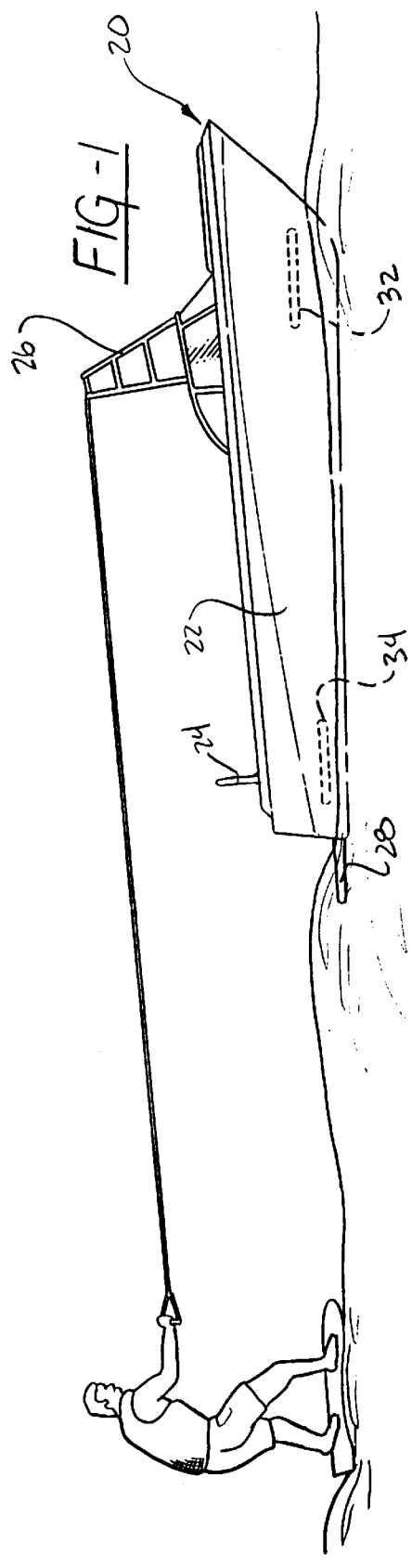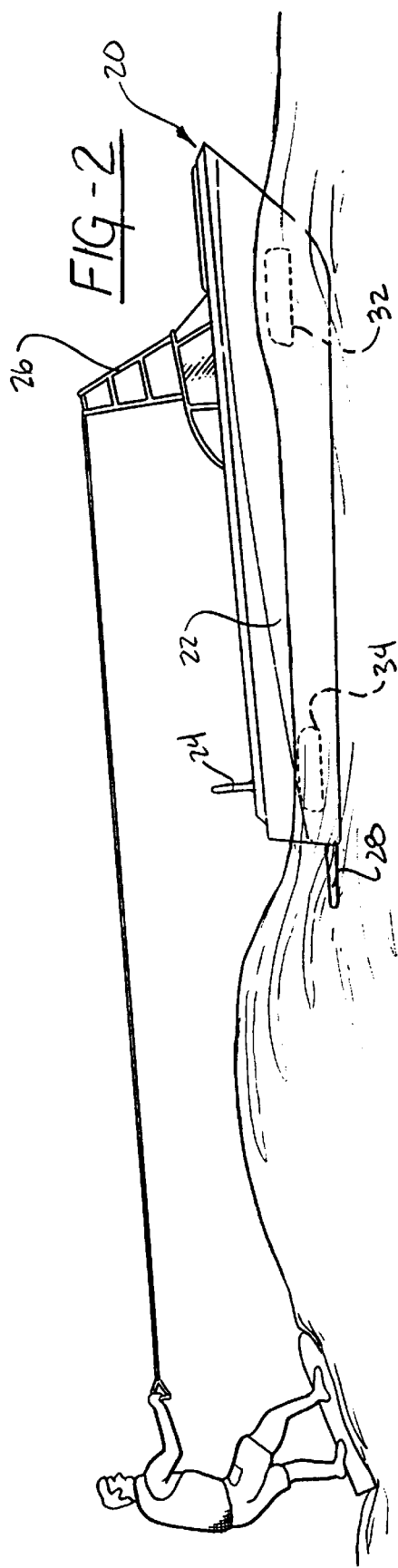

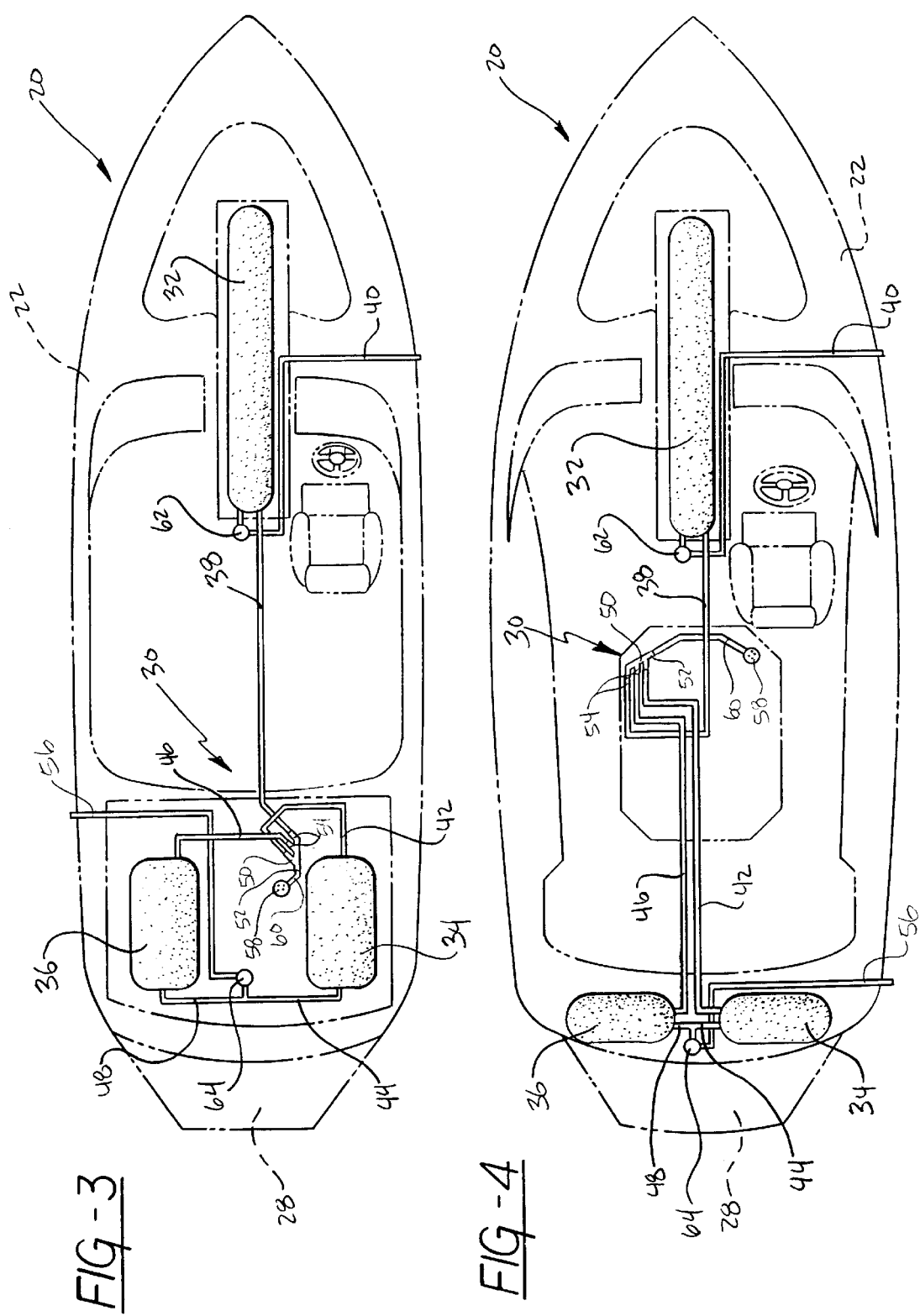

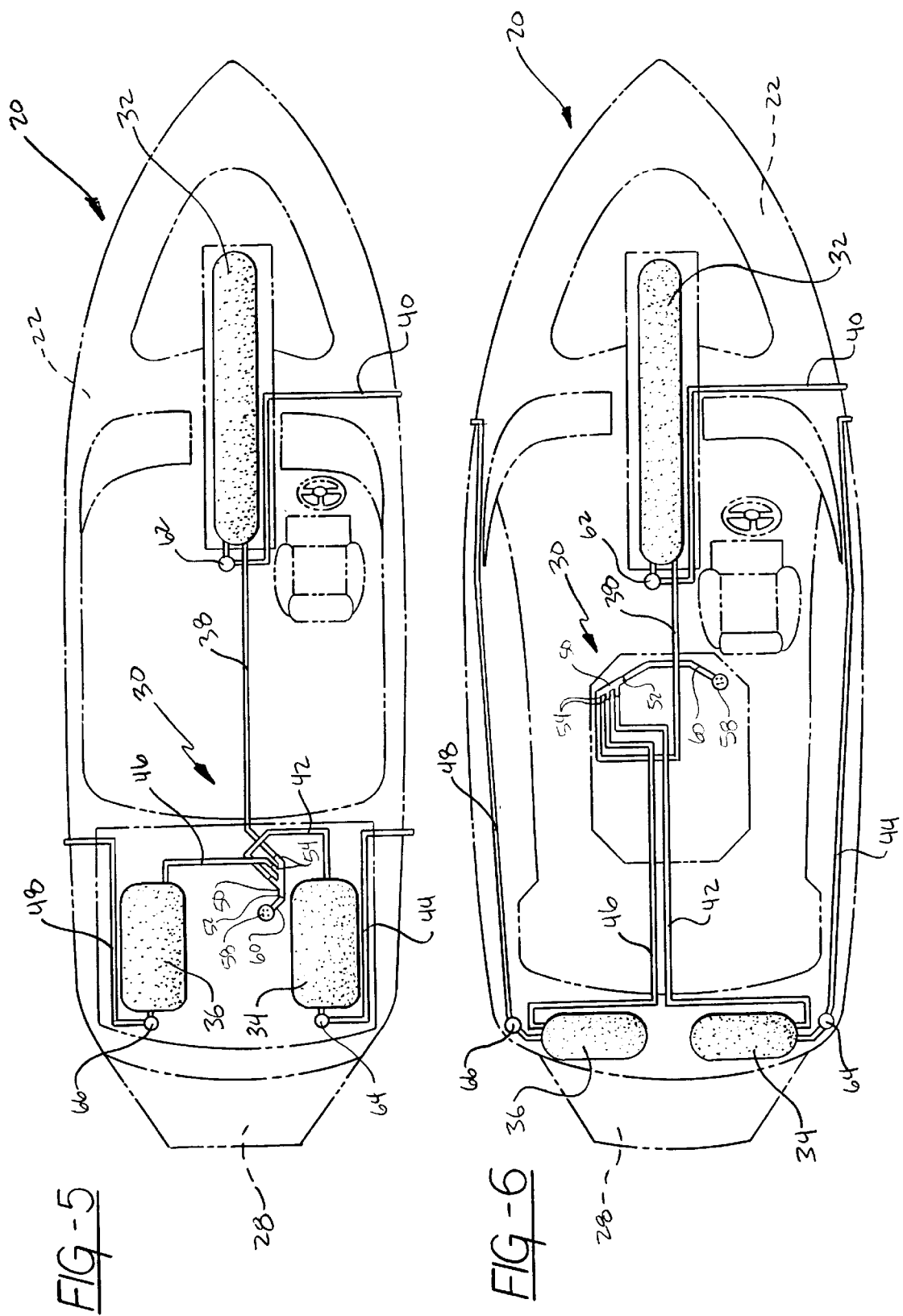

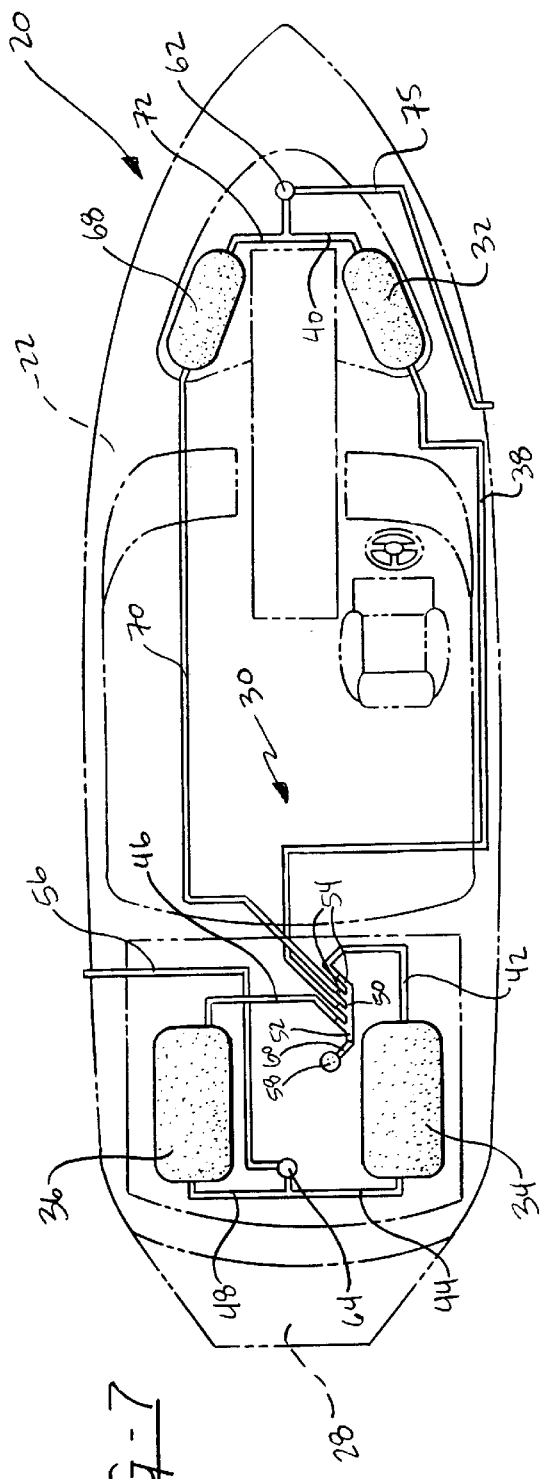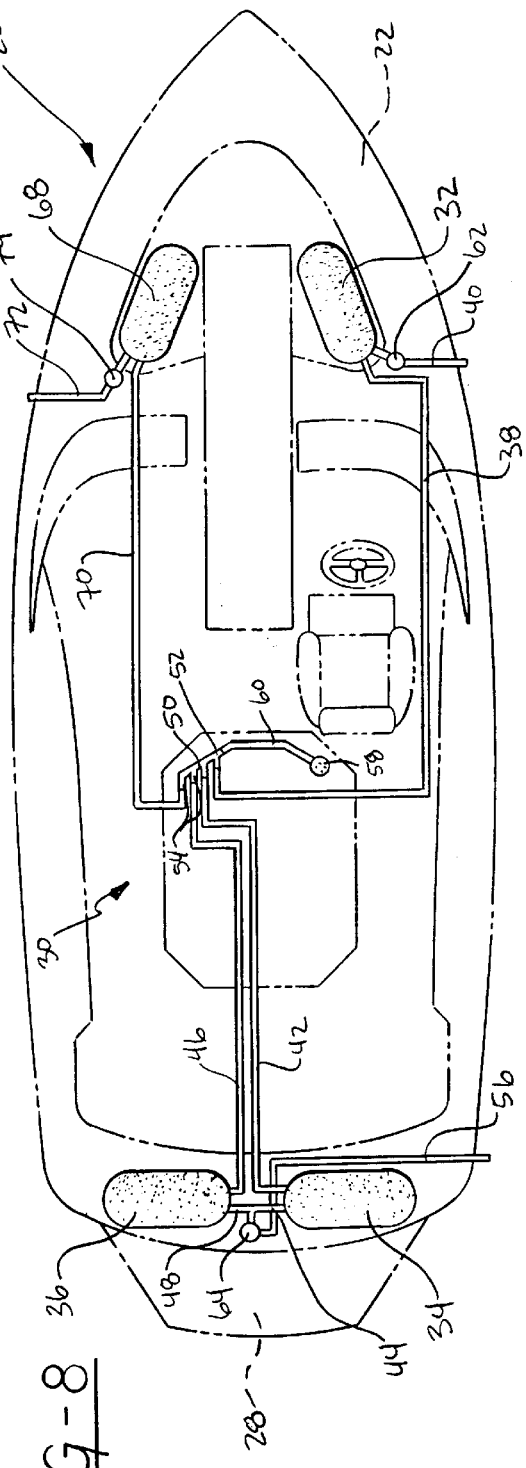
FIG-7
FIG-8

WAKE ENHANCEMENT ASSEMBLY

BACKGROUND OF THE INVENTION

1) Technical Field

The subject invention relates to a wake enhancement assembly which can increase a wake produced by a hull of a boat.

2) Description of the Prior Art

Water skiing has been a popular sport for many years and recently other similar sports, such as knee boarding, wake boarding, and wake skating, have also gained popularity. Unlike traditional water skiing and knee boarding; wake boarding and wake skating utilize a boats wake to perform jumps, spins, rolls, and other such tricks. In order to enhance the experience, an operator of the boat can vary the speed of the boat to create different shaped and sized wakes.

In an attempt to provide a better means in which to produce a larger or different wake, the prior art has developed a number of alternative devices. One such device is shown in U.S. Pat. No. 5,549,071 and uses a metal plate which can be hydraulically manipulated to move upward and downward into and out of the water behind the boat. This design, however, only changes the shape or attitude of the wake and does not change the size of the wake. Another design, which is shown in U.S. Pat. No. 6,105,527, utilizes large protuberances extending from the sides of the hull along with inverted hydrofoil members to produce larger wakes. This design is expensive, especially to retrofit onto an OEM boat, and overly complicated.

Another school of thought is to pump water into a container on the boat in selected areas such that the boat will experience a weight increase. Two such designs are shown in U.S. Pat. Nos. 5,787,835 and 6,158,375. Both of these designs have exposed water tanks which are manually filled through a removable filling tube. The filling tube typically includes a manual or electronic pump wherein an inlet is placed outside of the boat into the water and the outlet is mounted to the water tank. The water tank of the '835 patent must then be strapped tightly down such that the tank does not move within the boat and then the water tank can be drained by reversing the filling process. The design of the '835 patent is particularly inconvenient in that the water tank occupies a significant amount of space within the cabin of the boat. The water tank of the '375 patent is drained by manually removing a drain plug. These prior art water tanks cannot be conveniently filled and drained and cannot be filled while the boat is moving.

Accordingly, it would be desirable to provide a system which can provide a significant weight factor to selected areas of a boat, be automatically filled and drained while the boat is stationary or moving, be relatively inexpensive to retrofit to existing OEM boats, not be overly complicated, be concealed within the boat, and can be fully controlled from the helm of the boat.

SUMMARY OF THE INVENTION AND ADVANTAGES

A wake enhancement assembly for use with a boat having a hull to vary a configuration of a wake produced by the hull. The assembly comprises a first fluid chamber adapted to be disposed within the hull of the boat. At least one first conduit is mounted to and in fluid communication with the first fluid chamber for selectively filling and draining the first fluid chamber. A second fluid chamber is adapted to be disposed within the hull of the boat. The second fluid chamber is separated from the first fluid chamber. At least one second conduit is mounted to and in fluid communication with the second fluid chamber for selectively filling and draining the second fluid chamber. The assembly is characterized by a manifold having at least one inlet and a plurality of outlets. Each of the outlets has a valve disposed in fluid communication therewith. Each of the first and second conduits is connected to a respective outlet such that the valves of the manifold may control a flow of fluid to and from the first and second fluid chambers independently of each other, thereby controlling the selective filling and draining of the first and second chambers for varying the configuration of the wake produced by the hull of the boat.

Accordingly, the subject invention provides a system that can provide a significant weight factor to a selected area of a boat and be automatically filled and drained while the boat is stationary or moving. In addition, the subject invention is relatively inexpensive to retrofit to existing OEM boats and is not overly complicated. Finally, as is discussed in greater detail below with reference to the preferred embodiment, the subject invention includes a control panel such that the system can be fully controlled from the helm of the boat.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of a boat without a wake enhancement assembly being activated;

FIG. 2 is a side view of the boat with the wake enhancement assembly activated;

FIG. 3 is a top view of a boat with an inboard V-drive engine and a three chamber wake enhancement assembly;

FIG. 4 is a top view of a boat with an inboard direct-drive engine and the three chamber wake enhancement assembly;

FIG. 5 is a top view of a boat with an inboard V-drive engine and an alternative embodiment of the three chamber wake enhancement assembly of FIG. 3;

FIG. 6 is a top view of a boat with an inboard direct-drive engine and an alternative embodiment of the three chamber wake enhancement assembly of FIG. 4;

FIG. 7 is a top view of a boat with an inboard V-drive engine and a four chamber wake enhancement assembly;

FIG. 8 is a top view of a boat with an inboard direct-drive engine and the four chamber wake enhancement assembly;

DETAILED DESCRIPTION OF THE PREFERRED EMBODIMENT

Figure 9:
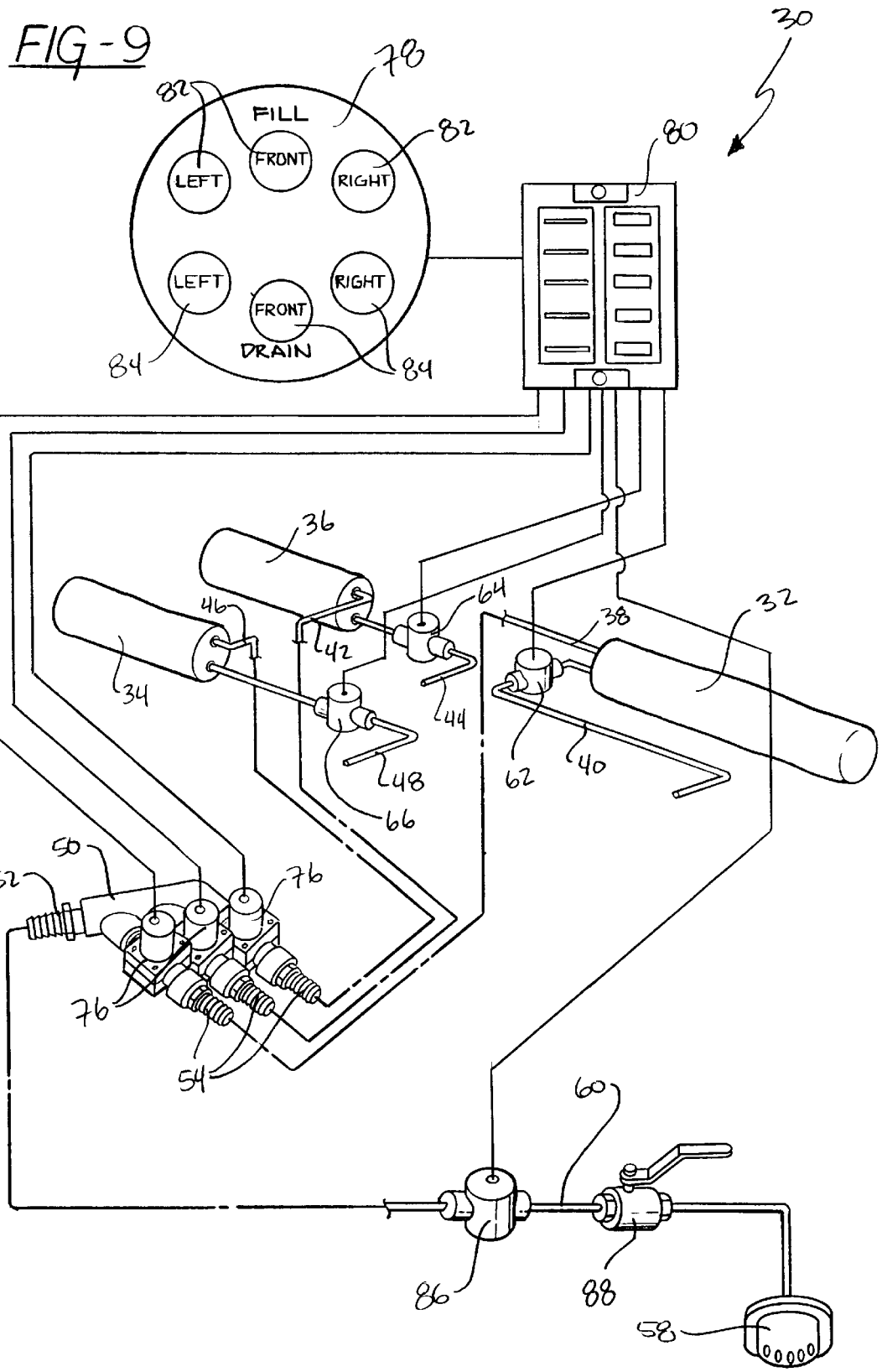
FIG. 9 is a perspective view of a three chamber wake enhancement assembly.

Referring to the Figures, wherein like numerals indicate like or corresponding parts throughout the several views, a boat 20 having a hull 22 is generally shown in FIGS. 1 and 2. The boat 20 is illustrated as a typical ski boat having a built in tow pole 24, enlarged ski tower 26, and a rear platform 28.

As is discussed above in the background section, the hull 22 of the boat 20 can create a variety of different sized and shaped wakes. The subject invention is designed to provide a means to create these different sized and shaped wakes. It should be appreciated that any type, size, and configuration of hull 22 and boat 20 may be utilized with the subject invention and the boat shown purely an illustrative example.

A wake enhancement assembly for use with the boat 20 is generally shown at 30 in FIGS. 3 through 9. The wake enhancement assembly 20 may be a three chamber wake enhancement assembly 30, such as shown in FIGS. 3 through 6, a four chamber wake enhancement assembly 30, such as shown in FIGS. 7 and 8, or any other suitable chamber configuration as will be discussed.

Referring again to FIG. 1, the wake enhancement assembly 30 includes at least a first 32 and second 34 fluid chamber which are shown drained. With the fluid chambers 32, 34 drained, the boat 20 rides relatively flat within a body of water and produce a normal wake configuration and height. As will be discussed in greater detail below, the fluid chambers 32, 34 can be selectively filled with water. As illustrated in FIG. 2, the fluid chambers 32, 34 are shown filled with fluid to provide additional to the boat 20. The boat 20 will then ride deeper within the water such that the hull 22 displaces more water. This added displacement will increase the size of the wake produced by the hull 22. For illustrative purposes, the first fluid chamber 32 is shown near the bow of the boat 20 and the second fluid chamber 34 is shown in the stem of the boat 20 such that the hull sinks within the water and the size of the wake is enlarged. As discussed in the background section, it is often desirable to create an enlarged or varied wake when wake boarding or wake skating.

Referring to FIGS. 3 and 4, a particular embodiment of the three chamber wake enhancement assembly 30 is shown in greater detail. This embodiment includes the first fluid chamber 32, the second fluid chamber 34 and a third fluid chamber 36 each adapted to be disposed within the hull 22 of the boat 20. The first 32, second 34, and third 36 fluid chambers are designed to be separated from each other and spaced throughout the boat 20.

The hull 22 of the boat 20, as in all boats, includes a bow section, mid section, and a stem section. The first fluid chamber 32 is preferably disposed within the mid/bow section and the second 34 and third 36 fluid chambers are preferably disposed within the stem section. A particular advantage of the subject invention is that each of the fluid chambers 32, 34, 36 is concealed within the hull 22 of the boat 20.

The designation of the terms first, second and third for the fluid chambers 32, 34, 36 in their respective illustrated locations is purely arbitrary and is not intended to be limiting. It should also be noted that the designation of a first and second fluid chamber in the claims is meant to reference any of the fluid chambers located within the boat. In other words, the first and second terms are not necessarily designed to directly coincide with the first and second terms as set forth in the detailed description.

The primary difference between the boats 20 shown in FIGS. 3 and 4 is the placement of the engine. The boat 20 shown in FIG. 3 includes an inboard V-drive engine and the boat 20 shown in FIG. 4 includes an inboard direct-drive engine. The boats 20 shown in FIGS. 3 and 4 also include an open floor plan which is common with these types of ski boats. The three chamber wake enhancement assemblies 20, which are discussed in greater detail below, are substantially identical.

At least one first conduit 38, 40, and preferably a first filling conduit 38 and a first draining conduit 40, are mounted to and in fluid communication with the first fluid chamber 32 for selectively filling and draining the first fluid chamber 32. Similarly, at least one second conduit 42, 44, and preferably a second filling conduit 42 and a second draining conduit 44, are mounted to and in fluid communication with the second fluid chamber 34 for selectively filling and draining the second fluid chamber 34. Also, at least one third conduit 46, 48, and preferably a third filling conduit 46 and a third draining conduit 48, are mounted to and in fluid communication with the third fluid chamber 36 for selectively filling and draining the third fluid chamber 36. As illustrated, the second 44 and third 48 drain conduits merge to provide a common drain 56 for both of the second 34 and third 36 chambers. Hence, in this embodiment, the second 34 and third 36 fluid chambers will be drained in unison and cannot be drained independently of each other.

A first drain pump 62 is fluidly interconnected between the first fluid chamber 32 and the first draining conduit 40. A second drain pump 64 is fluidly interconnected between the second 44 and third 48 drain conduits. The drain pumps 62, 64 are designed to provide a means for pumping fluid out of their respective fluid chambers 32, 34. The specifics regarding selective filling and draining of the first 32, second 34, and third 36 fluid chambers is discussed in greater detail below.

The wake enhancement assembly 30 is characterized by a manifold 50 having at least one inlet 52 and a plurality of outlets 54. The first 38, second 42, and third 46 filling conduits are connected to a respective outlet of the manifold 50 such that these conduits 38, 42, 46 are used as filling hoses. The first 40, second 44, and third 48 draining conduits are used as drain hoses.

An intake strainer 58 is adapted to be mounted to the hull 22 of the boat 20 for supplying fluid to the inlet of the manifold 50. The intake strainer 58 preferably includes a type of screen or mesh which prevents unwanted intrusion of debris. In addition, the intake strainer 58 is preferably mounted to a portion of the hull 22 that will remain submerged during virtually all modes of operation of the boat 20.

A manifold conduit 60 is mounted between the inlet 52 of the manifold 50 and the strainer 58 to fluidly connect the inlet 52 to the strainer 58. The first 38, second 42, and third 46 filling conduits, the first 40, second 44, and third 48 draining conduits, as well as the manifold conduit 60 are further defined as flexible hoses such that the wake enhancement assembly 30 may be easily installed within the hull 22 of the boat 20. As can be seen from the differences in FIGS. 3 and 4, the particular placement and orientation of the fluid chambers 32, 34, 36, conduits 38, 40, 42, 44, 46, 48, 60, and manifold 50 can vary depending upon the configuration of the boat 20. In addition, there may be multiple manifolds connected to a variety of fluid chambers depending upon the desired configuration.

Referring to FIGS. 5 and 6, another configuration of the three chamber wake enhancement assembly 30 is shown. FIG. 5 is substantially identical to FIG. 3 and FIG. 6 is substantially identical to FIG. 4 except that the common drain 56 for the second 34 and third 36 fluid chambers is removed. Hence, the second 34 and third 36 fluid chambers may be drained independently of each other through the second 44 and third 48 draining conduits, respectively. In order to facilitate the draining of the second 34 and third 36 fluid chambers, the second drain pump 64 is fluidly connected to the second draining conduit 44 and a third drain pump 66 is fluidly connected to the third draining conduit 48.

Referring also to FIGS. 7 and 8, an embodiment of the four chamber wake enhancement assembly 30 is shown. This embodiment disposes the second 34 and third 36 fluid chambers within the stem section of the hull 22 and disposes the first fluid chamber 32 and a fourth fluid chamber 68 within the bow section of the hull 22 separated from the second 34 and third 36 fluid chambers.

As with the first 32, second 34, and third 36 fluid chambers, at least one fourth conduit 70, 72, and preferably a fourth filling conduit 70 and a fourth draining conduit 72, are mounted to and in fluid communication with the fourth fluid chamber 68 for selectively filling and draining the fourth fluid chamber 68. As shown in FIG. 7, the first draining conduit 40 and the fourth draining conduit 72 of the first 32 and fourth 68 fluid chambers merge into a second common drain 75 such that the first 32 and fourth 68 fluid chambers are drained in unison. The first drain pump 62 is fluidly connected to the second common drain 75 to provide a means for draining the first 32 and fourth 68 fluid chambers. Alternatively, as shown in FIG. 8, the second common drain can be removed such that the first 32 and fourth 68 fluid chambers can be drained independently of each other. In this instance, a fourth drain pump 74 would be provided in fluid communication with the fourth draining conduit 72 for draining the fourth fluid chamber 68. The first drain pump 62 would then be placed in fluid communication with the first draining conduit 40.

The manifold 50 of the embodiments shown in FIGS. 7 and 8 has four outlets such that each of the first 38, second 42, third 46, and fourth 70 filling conduits are connected to a respective outlet of the manifold 50 to define respective filling hoses.

It should be appreciated that the configurations of the three chamber and four chamber wake enhancement assemblies 30 shown in FIGS. 3 through 8 are purely illustrative of contemplated configurations. There are many other configurations which may be used without deviating from the scope of the subject invention. In other words, there may be any number of fluid chambers positioned at any suitable location within any desirable type or style of boat without deviating from the scope of the subject invention.

Referring to FIG. 9, an embodiment of the three chamber wake enhancement assembly 30 is shown in greater detail. The three chamber wake enhancement assembly 30 illustrated is of the type disclosed in FIGS. 5 and 6 wherein there is an individual drain pump for each of the fluid chambers such that each of the fluid chambers may be drained independently of each other. It should be appreciated that many of the details disclosed in FIG. 9 will be present on the other contemplated variants of the subject invention.

In particular, the first 32, second 34, and third 36 fluid chambers each include a fill port and a drain port. The first 38, second 42, and third 46 filling conduits are mounted to a respective fill port of the fluid chambers 32, 34, 36. Similarly, the first 40, second 44, and third 48 draining conduits are mounted to a respective drain port of the fluid chambers 32, 34, 36. The first 32, second 34, and third 36 fluid chambers are preferably defined as collapsible bags having an outer protective sleeve. The fluid chambers may also be defined as integral chambers or voids within the hull 22 of the boat 20.

Figure 10:
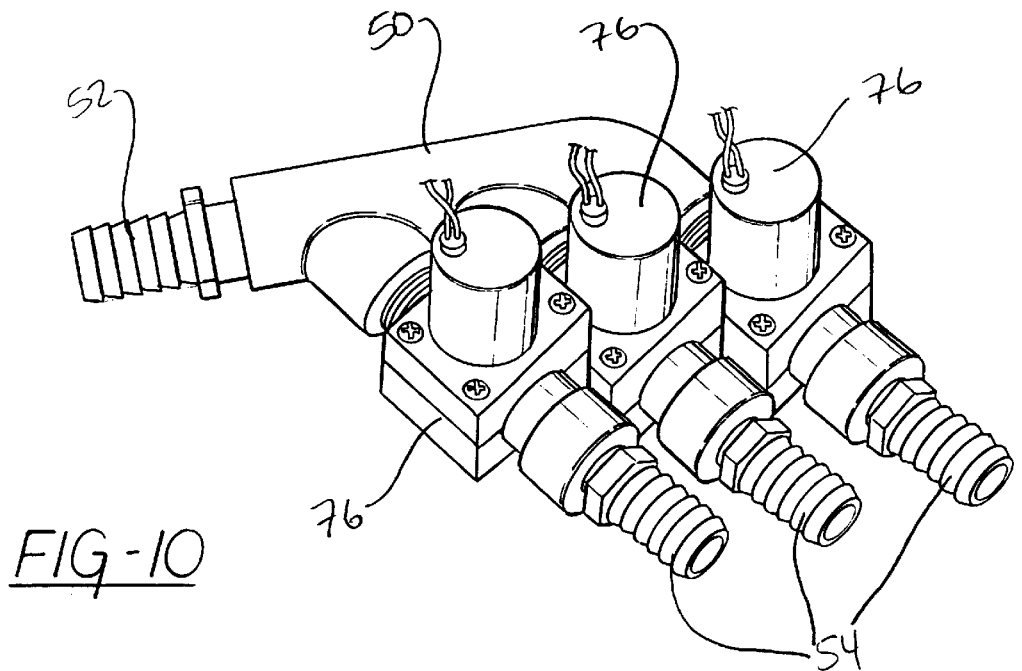
FIG. 10 is an enlarge view of a manifold.

Referring also to FIG. 10, the manifold 50 is illustrated in greater detail. Each outlet 54 of the manifold 50 has a valve 76 disposed in fluid communication therewith. Preferably, each of the valves 76 is an electronic valve 76 of any suitable design which can be remotely opened and closed. The valves 76 of the manifold 50 may control a flow of fluid to and from the first 32, second 34, and third 36 fluid chambers independently of each other. Hence, the manifold 50 and valves 76 can control the selective filling and draining of the first 32, second 34, and third 36 chambers for varying the configuration of the wake produced by the hull 22 of the boat 20.

A control panel 78 is electrically connected to the electronic valves 76 to facilitate the remote operation of the valves 76. Preferably, the control panel 78 is connected to the valve 76 through a master control unit 80. The control panel 78 is preferably a round panel 78 having three fill buttons 82, i.e., switches, left, front, and right, and three drain buttons 84, i.e., switches, left, front, and right. This allows an operator to independently fill or drain the three fluid chambers 32, 34, 36. This particular design of the control panel 78 is desirable with the three chamber wake enhancement assembly 30 shown in FIGS. 5, 6, and 9 such that the filling and draining control of the fluid chambers 32, 34, 36 can be easily accomplished. The master control unit 80 is preferably a computer controlled hub of any suitable design. The valves 76, pumps 62, 64, 66, 74, 86 and other electronic devices are all connected through the computer controlled hub which creates a versatile and efficient assembly 30. It should be appreciated that the design of the control panel 78 and master control unit 80 could be modified for providing more or less flexibility in the filling and draining of two, three, four or more fluid chambers.

Figure 11:
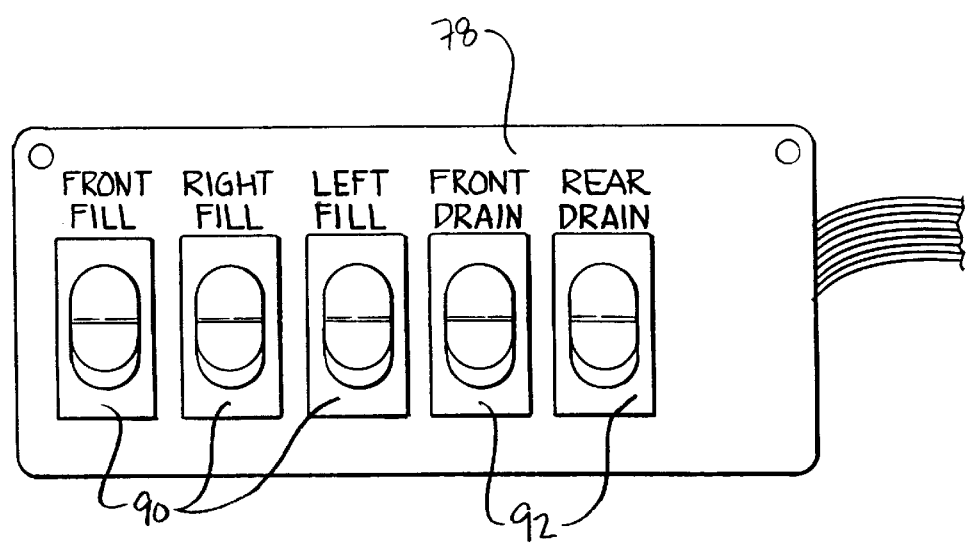
FIG. 11 is an alternative view of a control panel.

For example, referring to FIG. 11, an alternative embodiment of the control panel 78 is illustrated. This control panel 78 includes five rocker switches defining three fill switches 90 and two drain switches 92. This control panel 78 design could be useful for a three chamber wake enhancement assembly 30 such as shown in FIGS. 3 and 4 or a four chamber wake enhancement assembly 30 such as shown in FIG. 7. This type of control panel 78, as shown in FIG. 11, typically uses a fuse panel, not shown, as is known in the art. As eluded to above, the control panel may be of any suitable design or configuration depending upon the number of fluid chambers used and the placement of the fluid chambers.

Referring back to FIGS. 9 and 10, a fill pump 86 is fluidly interconnected between the inlet 52 of the manifold 50 and the intake strainer 58. To provide a measure of safety, a manual override valve 88 is fluidly interconnected between the fill pump 86 and the intake strainer 58. The manual override valve 88 may be actuated to prevent the inflow of fluid into the inlet 52 of the manifold 50. Each of the fill pump 86, and the first 62, second 64, and third 66 drain pumps are electrically connected to the control panel 78 through the master control unit 80 such that these pumps 62, 64, 66, 86 may be remotely controlled from a helm of the boat 20.

The method of modifying a wake produced by the hull 22 of the boat 20 utilizing the three or four chamber wake enhancement assembly 30 is now discussed in greater detail. In particular, the method will be discussed with reference to filling and separately draining the second 34 and third 36 fluid chambers located in the stem section of the hull 22, such as shown in FIGS. 5 and 6. This illustrative example is in no way intended to limit the subject invention and certainly any combination of filling and draining operations can be performed. In fact, in most applications, all of the fluid chambers within the boat 20 would be filled at the same time in order to provide the greatest amount of displacement.

The method comprises the steps of first opening the inlet 52 to supply fluid, i.e. water, to the manifold 50. Before the inlet 52 is opened, any fluid within the fluid chambers 32, 34, 36, 68 should be drained. This ensures proper filling of the fluid chambers 32, 34, 36, 68 and proper weight distribution within the boat 20.

One of the valves 76 is then actuated to open the valve 76 and provide fluid communication between the inlet 52 and a second outlet 54. For illustrative purposes, the second filling conduit 42 will be connected to the now opened second outlet 54. The second fluid chamber 34 is then filled with the fluid through the second outlet 54 and the second filling conduit 42 for providing additional weight to a first portion of the hull 22 of the boat 20. As arranged in FIGS. 5 and 6, the first portion of the hull 22 equates to starboard side of the stem section. This will modify the wake produced by the hull 22.

Another valve 76 is subsequently actuated to open the valve 76 and provide fluid communication between the inlet 52 and a third outlet independently of the fluid communication with the second outlet. For illustrative purposes, the third filling conduit 46 will be connected to the now opened third outlet 54. The third fluid chamber 36 is then filled with the fluid through the third outlet 54 and the third filling conduit 46 for providing additional weight to a second portion of the hull 22 of the boat 20. As arranged in FIGS. 5 and 6, the second portion of the hull 22 equates to port side of the stem section. This further modifies the wake produced by the hull 22. The remaining fluid chambers 32, 68, if any, may also be filled by opening the associated valve 76. The wake of the boat 20 is now significantly increased.

One of the valves 76 can then be actuated to close the valve 76 and block the fluid communication between the inlet 52 and the second outlet 54. The second drain pump 64 is then actuated to automatically drain the fluid out of the second fluid chamber 34 through the second draining conduit 44 for reducing the weight applied to the first portion of the hull 22 of the boat 20. Similarly, another valve 76 can be actuated to close the valve 76 and block the fluid communication between the inlet 52 and the third outlet 54. The third drain pump 66 is then actuated to automatically drain the fluid out of the third fluid chamber 36 through the third draining conduit 48 for reducing the weight applied to the second portion of the hull 22 of the boat 20. The filling and draining of the various fluid chambers, i.e., one, two, three, etc., can be done independently of each other in any particular order such that a wide range of wake configurations and sizes can be created. In particular, the filling and draining of the fluid chambers can be finely tuned such that a smooth laminar wake is created and maintained. This fine tuning can compensate for irregularities in the hull configuration or other such variables, wherein without the subject invention, the wake could be frothing or otherwise present a non-laminar surface. The example set forth above regarding the second 34 and third 36 fluid chambers filling and then draining is purely illustrative of one contemplated order of steps.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A wake enhancement assembly for use with a boat having a hull to vary a configuration of a wake produced by the hull, said assembly comprising:

a first fluid chamber adapted to be disposed within the hull of the boat;

at least one first conduit mounted to and in fluid communication with said first fluid chamber for selectively filling and draining said first fluid chamber;

a second fluid chamber adapted to be disposed within the hull of the boat, said second fluid chamber being separated from said first fluid chamber; and at least one second conduit mounted to and in fluid communication with said second fluid chamber for selectively filling and draining said second fluid chamber;

said assembly characterized by a manifold having at least one inlet and a plurality of outlets with each of said outlets having a valve disposed in fluid communication therewith, each of said first and second conduits being connected to a respective outlet such that said valves of said manifold may control a flow of fluid to and from said first and second fluid chambers independently of each other, thereby controlling the selective filling and draining of said first and second chambers for varying the configuration of the wake produced by the hull of the boat.

2. An assembly as set forth in claim 1 wherein each of said valves is an electronic valve which can be remotely opened and closed.

3. An assembly as set forth in claim 2 further including a control panel electrically connected to said electronic valves to facilitate the remote operation of the valves.

4. An assembly as set forth in claim 2 wherein said first and second fluid chambers each include a fill port and a drain port.

5. An assembly as set forth in claim 4 further including a pair of first conduits mounted to and in fluid communication with said first fluid chamber with one of said first conduits mounted to said fill port and another of said first conduits mounted to said drain port of said first fluid chamber.

6. An assembly as set forth in claim 4 further including a pair of second conduits mounted to and in fluid communication with said second fluid chamber with one of said second conduits mounted to said fill port and another of said second conduits mounted to said drain port of said second fluid chamber.

7. An assembly as set forth in claim 4 wherein each of said first and second fluid chambers are further defined as collapsible bags having an outer protective sleeve.

8. An assembly as set forth in claim 7 further including an intake strainer adapted to be mounted to said hull of said boat for supplying fluid to said inlet of said manifold.

9. An assembly as set forth in claim 8 further including a manifold conduit mounted between said inlet and said strainer to fluidly connect said inlet to said strainer.

10. An assembly as set forth in claim 9 wherein said first conduits, said second conduits, and said manifold conduit are further defined as flexible hoses.

11. An assembly as set forth in claim 9 further including a fill pump fluidly interconnected between said inlet of said manifold and said intake strainer.

12. An assembly as set forth in claim 11 further including a manual override valve fluidly interconnected between said fill pump and said intake strainer.

13. An assembly as set forth in claim 11 further including a first drain pump fluidly interconnected between said drain port of said first fluid chamber and said corresponding first conduit.

14. An assembly as set forth in claim 13 further including a second drain pump fluidly interconnected between said drain port of said second fluid chamber and said corresponding second conduit.

15. A wake enhancement assembly to vary a configuration of a wake, said assembly comprising:
   a boat having a hull for creating the wake;
   a first fluid chamber disposed within said hull;
   at least one first conduit mounted to and in fluid communication with said first fluid chamber for selectively filling and draining said first fluid chamber;
   a second fluid chamber disposed within said hull separated from said first fluid chamber; and
   at least one second conduit mounted to and in fluid communication with said second fluid chamber for selectively filling and draining said second fluid chamber;
   said assembly characterized by a manifold having at least one inlet and a plurality of outlets with each of said outlets having a valve disposed in fluid communication therewith, each of said first and second conduits being connected to a respective outlet such that said valves of said manifold may control a flow of fluid to and from said first and second fluid chambers independently of each other, thereby controlling the selective filling and draining of said first and second chambers for varying the configuration of the wake produced by the hull of the boat.

16. An assembly as set forth in claim 15 wherein said hull of said boat includes a bow section, mid section, and a stem section with said first fluid chamber disposed within said stem section and said second fluid chamber disposed within said mid section.

17. An assembly as set forth in claim 16 further including a third fluid chamber disposed within said stem section of said hull separated from said first and second fluid chambers with at least one third conduit mounted to and in fluid communication with said third fluid chamber for selectively filling and draining said third fluid chamber.

18. An assembly as set forth in claim 17 wherein said third conduit is connected to a respective outlet of said manifold such that said valves of said manifold may control a flow of fluid to and from said third fluid chamber independently of fluid flow to and from said first and second fluid chambers.

19. An assembly as set forth in claim 15 wherein said hull of said boat includes a bow section, mid section, and a stem section with said first and second fluid chambers disposed within said stem section.

20. An assembly as set forth in claim 19 further including a third and a fourth fluid chamber each disposed within said bow section of said hull separated from said first and second fluid chambers.

21. An assembly as set forth in claim 20 further including at least one third conduit mounted to and in fluid communication with said third fluid chamber for selectively filling and draining said third fluid chamber, and at least one fourth conduit mounted to and in fluid communication with said fourth fluid chamber for selectively filling and draining said fourth fluid chamber.

22. An assembly as set forth in claim 21 wherein each of said third and fourth conduits are connected to a respective outlet of said manifold such that said valves of said manifold may control a flow of fluid to and from said third and fourth fluid chambers independently of fluid flow to and from said first and second fluid chambers.

23. An assembly as set forth in claim 15 wherein each of said valves is an electronic valve which can be remotely opened and closed.

24. An assembly as set forth in claim 23 further including a control panel mounted within said boat and electrically connected to said electronic valves to facilitate the remote operation of the valves.

25. An assembly as set forth in claim 15 further including an intake strainer mounted to said hull of said boat for supplying fluid to said inlet of said manifold.

26. An assembly as set forth in claim 25 further including a manifold conduit mounted between said inlet and said strainer to fluidly connect said inlet to said strainer.

27. An assembly as set forth in claim 26 further including a fill pump fluidly interconnected between said inlet of said manifold and said intake strainer.

28. An assembly as set forth in claim 27 further including a drain pump fluidly interconnected to each of said first and second fluid chambers to selectively drain said first and second fluid chambers.

29. An assembly as set forth in claim 18 further including a drain pump fluidly interconnected to said third fluid chamber to selectively drain said third fluid chamber.

30. An assembly as set forth in claim 22 further including a drain pump fluidly interconnected to each of said third and fourth fluid chambers to selectively drain said third and fourth fluid chambers.

31. A method of modifying a wake produced by a hull of a boat utilizing a wake enhancement assembly having a first fluid chamber, a second fluid chamber, and a manifold, the manifold includes at least one inlet and first and second outlets with each of the outlets having a valve, the first and second chambers are connected to the first and second outlets, respectively, said method comprising the steps of:
   opening the inlet to supply fluid to the manifold;
   actuating one of the valves to open the valve and provide fluid communication between the inlet and the first outlet;
   filling the first fluid chamber with the fluid through the first outlet for providing additional weight to a first portion of the hull of the boat, thereby modifying the wake produced by the hull;
   actuating another valve to open the valve and provide fluid communication between the inlet and the second outlet independently of the fluid communication with the first outlet;
   filling the second fluid chamber with the fluid through the second outlet for providing additional weight to a second portion of the hull of the boat, thereby further modifying the wake produced by the hull.

32. A method as set forth in claim 31 further including the step of draining any fluid within said first and second fluid chambers before opening the inlet to supply fluid to the manifold.

33. A method as set forth in claim 31 further including the step of actuating one of the valves to close the valve and block the fluid communication between the inlet and the first outlet.

34. A method as set forth in claim 33 further including the step of draining the fluid out of the first fluid chamber through a first drain port for reducing the weight applied to the first portion of the hull of the boat.

35. A method as set forth in claim 31 further including the step of actuating another valve to close the valve and block the fluid communication between the inlet and the second outlet.

36. A method as set forth in claim 35 further including the step of draining the fluid out of the second fluid chamber through a second drain port for reducing the weight applied to the second portion of the hull of the boat.

37. A manifold for use within a hull of a boat wherein the hull includes a first fluid chamber and a second fluid chamber which can be selectively filled and drained for varying a configuration of a wake produced by the hull of the boat, said manifold comprising:

at least one inlet for supplying fluid to said manifold;

a plurality of outlets for dispensing the fluid into at least one of said first and second fluid chambers; and a valve disposed in fluid communication with each of said outlets for controlling the dispensing of the fluid to the first and second fluid chambers independently of each other, thereby controlling the selective filling and draining of the first and second chambers.

38. An assembly as set forth in claim 37 wherein each of said valves is an electronic valve which can be remotely opened and closed.

39. An assembly as set forth in claim 38 further including a control panel electrically connected to said electronic valves to facilitate the remote operation of the valves.

40. An assembly as set forth in claim 39 further including an intake strainer adapted to be mounted to said hull of said boat for supplying fluid to said inlet of said manifold.

41. An assembly as set forth in claim 40 further including a manifold conduit mounted between said inlet and said strainer to fluidly connect said inlet to said strainer.

42. An assembly as set forth in claim 41 further including a fill pump fluidly interconnected between said inlet of said manifold and said intake strainer.

43. An assembly as set forth in claim 42 further including a manual override valve fluidly interconnected between said fill pump and said intake strainer.

* * * * *